United States Patent [19]

Lish

[11] 4,122,490
[45] Oct. 24, 1978

[54] DIGITAL CHROMA-KEY CIRCUITRY

[76] Inventor: Charles A. Lish, 930 Madison St., Woodmere, N.Y. 11598

[21] Appl. No.: 739,849

[22] Filed: Nov. 9, 1976

[51] Int. Cl.² ............................................. H04N 5/22
[52] U.S. Cl. ..................................................... 358/22
[58] Field of Search ............................. 358/26, 22, 28

[56] References Cited

U.S. PATENT DOCUMENTS

| 2,956,112 | 10/1960 | O'Toole | 358/26 X |
| 3,673,320 | 6/1970 | Carnt et al. | 358/28 X |
| 3,959,813 | 5/1976 | Legler | 358/22 |
| 4,040,086 | 8/1977 | Wellhousen et al. | 358/22 |

Primary Examiner—Robert L. Griffin
Assistant Examiner—Aristotelis M. Psitos
Attorney, Agent, or Firm—Fitzpatrick, Cella, Harper & Scinto

[57] ABSTRACT

A chroma-key circuit is described for use in alternately selecting one of two TV camera outputs to provide a composite picture, wherein the selection is controlled by detecting changes between a background color and an object color sensed by one of the two cameras. Keying is accomplished digitally by comparing the phase of the chrominance signal from the one camera with the phase of a reference signal, and by switching the circuitry to transmit the signal from the one camera only when the chrominance and reference signals are out of synchronization.

6 Claims, 4 Drawing Figures

DIGITAL CHROMA-KEY CIRCUITRY

BACKGROUND OF THE INVENTION

Chroma-key circuits are well known in the broadcast industry. By the use of such circuits it is possible to transmit composite pictures which alternately use the outputs from two separate cameras. For example, a street scene may be transmitted wherein the face of an announcer may be compositely placed in one corner to form the composite picture. Also, the composite presentation may depict an action scene appearing as the background of the picture, with the announcer standing the midst of the action scene.

Chroma-key techniques are used to affect such composite broadcast signals, for example, by placing the announcer in front of a single-color backdrop, and by sensing changes in the output from the announcer's camera to develop an output signal for switching between the announcer's camera and the action camera. For example, whenever the single-color backdrop is picked up during the sweep of the announcer's camera, the synchronized sweep of the action camera output is transmitted; while the output from the announcer's camera is transmitted whenever there is an absence of the backdrop color during the sweep of the announcer's camera.

A conventional method of chroma-keying utilized by the broadcast industry is to sense the ratio between the red, green and blue output signals from the announcer's camera, and when these ratios correspond to a predetermined value the chroma-key circuit operates to key the action camera. An absence of the predetermined ratio will cause the circuit to key the announcer's camera. The ratio should be a linear relationship, and the circuitry necessary to determine the linear relationships between the various colors and to generate the keying signal used to switch between the two cameras is quite complex and therefore expensive. Furthermore, cameras produced by some manufacturers do not provide separate red, green and blue output signals wherefore the conventional chroma-key circuit described above cannot be used without additional demodulating circuits. One patented example of circuitry which processes the three individual color signals is described in U.S. Pat. No. 3,678,182.

Accordingly, an object of the present invention is to provide a less complex chroma-key circuit capable of utilizing the standard composite NTSC signal which is generated by most known color cameras in the United States.

SUMMARY OF THE INVENTION

In accordance with the present invention, the standard NTSC signal from the keying camera is fed through a filter wherein the chrominance portion of the signal is isolated for application to a signal shaping circuit. The shaping circuit converts the sine wave chrominance signal into a square wave which is more adaptable for processing by conventional TTL techniques. The chrominance signal will have a certain phase relationship with respect to the $E_B-E_Y$ phasor, depending on the color it is intended to represent. A phase reference signal is produced by a standard generator and the phase of that reference signal is adjusted to be identical to that of the background chrominance signal from the keying camera. The shaped reference signal and chrominance signal are then applied to an $\overline{AND}$ circuit which provides an output whenever there is coincidence between the two signals. From the above description it is seen that such coincidence will exist and will be maximized whenever the keying camera is sweeping past the single color backdrop.

One well known phase detecting technique, utilizing an AND circuit, functions to determine the desired coincidence by utilizing several comparisons from the AND circuit, and by generating a DC voltage which increases with an increase in coincidence time. This conventional technique is not utilized in the present invention, however, wherein a high speed detection of the coincidence is required.

In the present invention, a unique timing circuit is provided for timing the period of coincidence between the chrominance signal and reference signal. That is, a one-shot is triggered at the beginning of coincidence between the reference and chrominance signals, and the output of the $\overline{AND}$ circuit together with the output of the one-shot are applied to a clocked astable flip flop, wherein the clock signal is derived from the one-shot. Accordingly, the clocked flip flop senses the relative durations of the one-shot output and the $\overline{AND}$ circuit output to determine which of those outputs terminates first. If the $\overline{AND}$ circuit output lasts longer than the pre-determined period of the one-shot, thus indicating that the keying camera is sweeping past the single-color backdrop since the two signals feeding the $\overline{AND}$ circuit are in phase, then the keying signal causes the output from the action camera to be transmitted. A shorter $\overline{AND}$ circuit output will cause the keying camera output to be transmitted, since the two $\overline{AND}$ inputs are then out of phase, thus indicating that the keying camera is sweeping past the object which is to be compositely placed in the picture.

In addition to these general principles of the invention there is also disclosed a circuit for controlling undesired fringing effects. The term "fringing effects" relates to the imperfections which are noticed along the border of the object which is being keyed. A circuit for preventing such objectionable fringing characteristics operates by delaying the output of the keying signal by utilizing the luminance portion of the NTSC signal to control the output of the clocked flip-flop. In this manner the circuitry precludes false triggering of the keying signal, since that signal is initiated in response to the luminance signal which most accurately corresponds to the lines of separation between the object and the backdrop sensed by the keying camera. The luminance signal is passed through a differentiator which generates a pulse at every sharp increase or decrease of the luminance signal. A predetermined minimum amplitude of the differentiated signals is utilized as a clock pulse and applied to control the timing of the keying signal generated by the above described clocked flip-flop. The selected differentiated signals are applied through a delay line to prevent an otherwise segmented appearance which results from the digital techniques utilized for comparing the phase of the chrominance signal.

BRIEF DESCRIPTION OF THE DRAWINGS

The principles of the present invention will be described in conjunction with a preferred embodiment depicted in the accompanying drawings. In such drawings.

DETAILED DESCRIPTION OF THE PREFERRED EMBODIMENT

Figure 1:
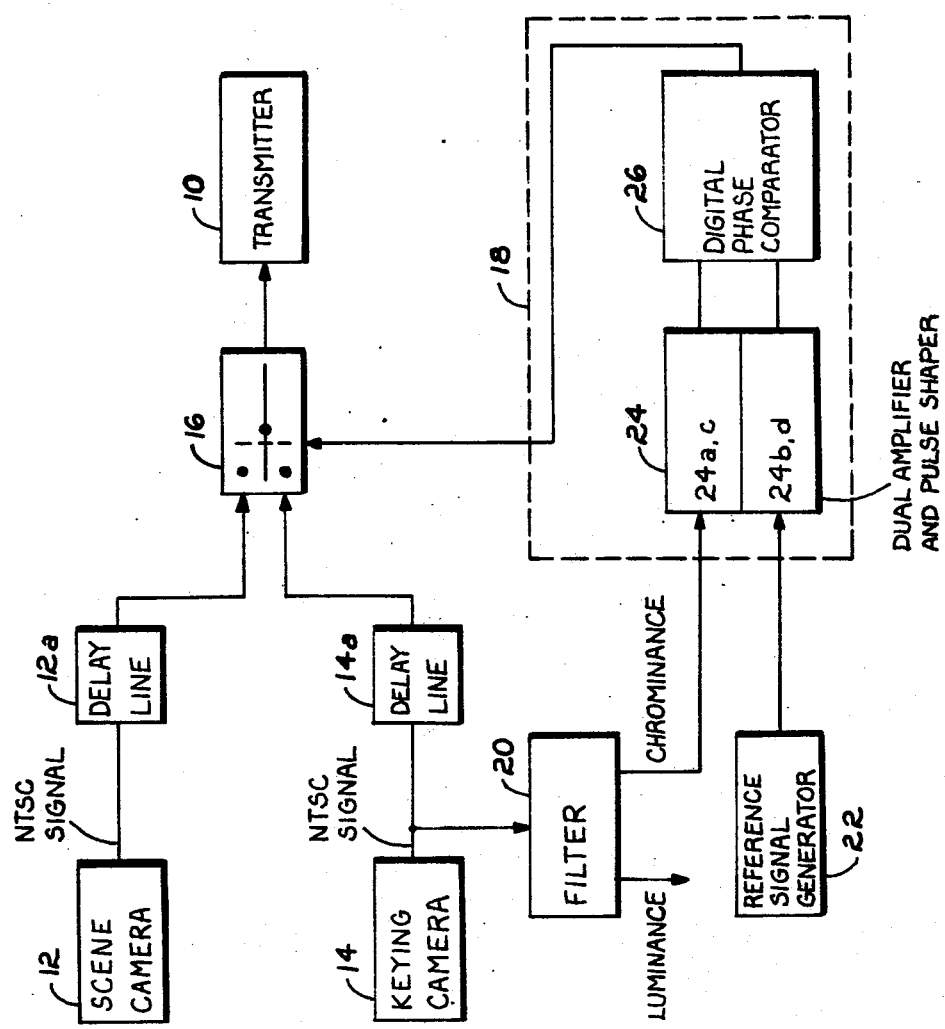
FIG. 1 is a block diagram indicating the functional relationships of the elements in a preferred embodiment of the invention.

The broad principle of the present invention, as depicted in FIG. 1 of the drawings, resides in the controlled switching between two T.V. camera outputs to provide a composite output to a transmitter 10. By synchronizing the sweeps of the two cameras, it is possible to thereby alternately transmit the output from a "scene" camera 12 to form one portion of a composite signal, and to transmit the output from a "keying" camera 14 to form another portion of that composite signal. The selection of camera outputs by a switch 16 is controlled by a digital selection circuit 18 which senses phase changes in an NTSC output from the keying camera. To this end, the NTSC output from the keying camera 14 is applied through a filter 20 to the digital selection circuit 18, together with a second input applied to the circuit 18 from a reference generator 22. For timing purposes, the respective camera outputs are coupled to the switch via delay lines 12a and 14a.

In accordance with color television technology as practiced for example in the United States, color cameras provide a compatible output signal which is designated as an NTSC signal, and which is expressed as:

$$E_M = E_Y + E_I \cos(wt + 33°) + E_Q \sin(wt + 33°)$$

In the above equation, the quantity $E_Y$ is referred to as the "luminance" portion of the signal, while the remaining two quantities define the chrominance portion of the signal. The NTSC signal is derived from the following equations:

$$E_Y = 0.30E_{R'} + 0.59E_{G'} + 0.11E_{B'}$$

$$E_I = 0.60E_{R'} - 0.28E_{G'} - 0.32E_{B'}$$

$$E_Q = 0.21E_{R'} - 0.52E_{G'} + 0.31E_{B'}$$

wherein the quantities $E_{R'}$, $E_{G'}$, and $E_{B'}$ are related to the red, green and blue colors sensed by the camera.

The chrominance portion of the signal $E_M$, as defined above, may be expressed as a phase angle dependent upon the hue of the NTSC signal. That phase angle is defined by the equation:

$$\phi = \arctan[(1.78(E_{R'} - E_Y/E_B - E_Y))]$$

Accordingly, it is seen that the NTSC signal may be expressed, at any instant, by an amplitude, the luminance portion of the signal, and a phase angle $\phi$ indicating the proper color to be reproduced at that instant.

It is known that the color blue occupies a large angle of the 360° continuum of colors provided by the phase angle $\phi$ and therefore it is preferable to use the color blue as the backdrop for the keying camera. Accordingly, the backdrop is preferably selected to provide a phase angle $\phi$ within the range of blue colors which are centered at 300°.

Figure 2:
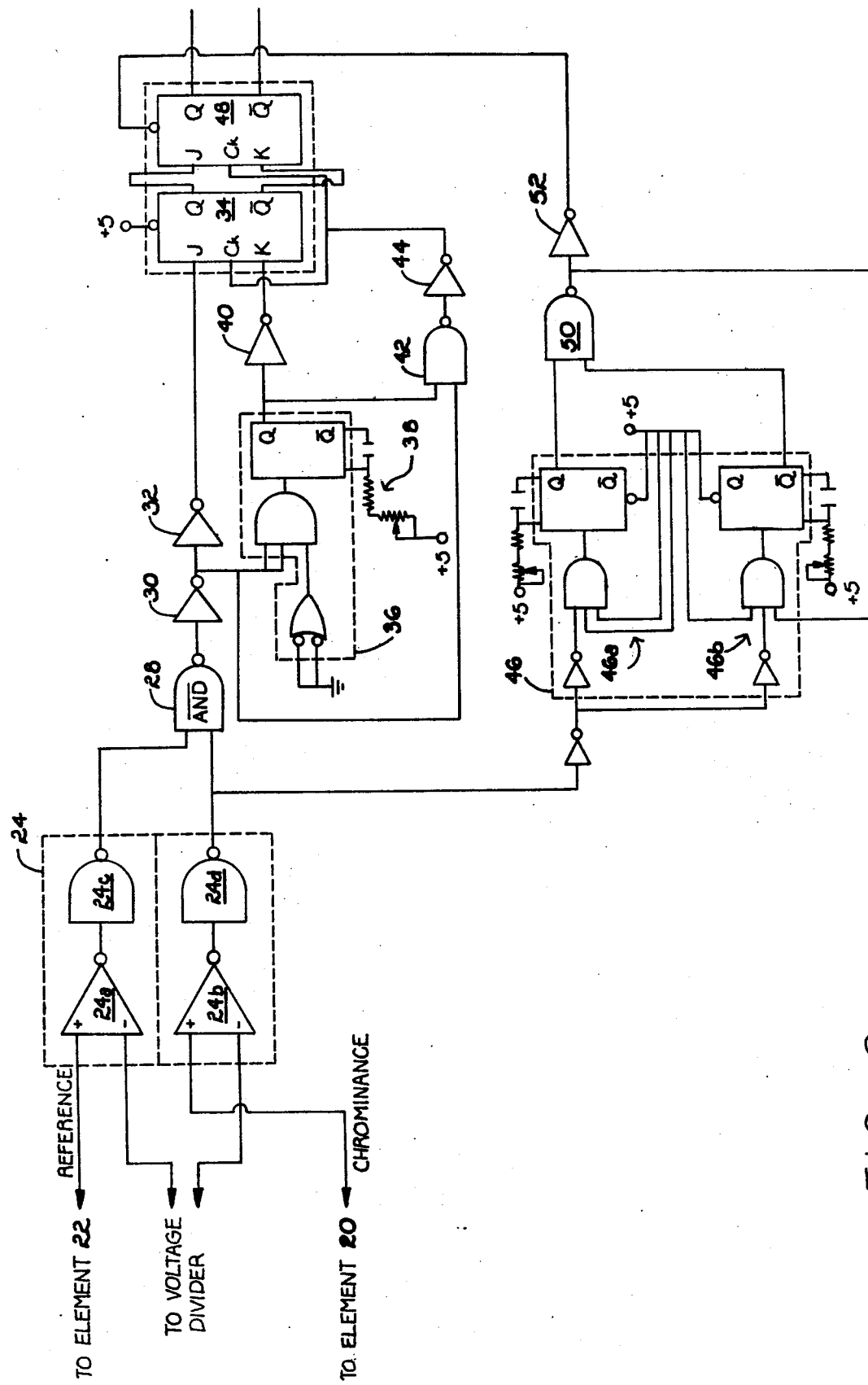
FIG. 2 is a schematic diagram of the digital selection circuit illustrated in FIG. 1.

As illustrated in FIG. 1, the above described NTSC signal from the keying camera is applied through the filter 20 to a signal shaping circuit 24. The filter 20 may constitute a comb filter, or a filter such as presently embodied in commercial color T.V. receivers and adaptable for use in isolating the chrominance signal from the NTSC signal. The signal shaping circuit 24 may comprise for example a Signetics 521 dual comparator-inverter device, wherein the chrominance signal from the filter 20 is applied as an input to one of the comparators 24a, while the reference signal from the generator 22 is applied as an input to the other comparator 22b. Fixed signals are applied to the other inputs of each of the two comparators for use in generating shaped output signals, and these interconnections are shown also in FIG. 2 of the drawings which shows the details of the digital selection circuit 18. The reference signal generator 22, having its output applied to one of the dual comparators, may constitute a special effects generator for providing a reference signal having a phase corresponding to the color background sensed by the keying camera, and it may be applied through an adjustable phase shifter. That is, the phase of the reference signal is adjusted to correspond closely to the phase of the chrominance signal related to the backdrop of the keying camera. The outputs of the dual comparators are applied respectively through inverters 24c and 24d as inputs to an $\overline{\text{AND}}$ circuit 28. The output of the $\overline{\text{AND}}$ circuit 28 is applied through two series connected inverters 30 and 32 to an input of a clocked flip-flop 34. In this regard, the clocked flip-flop 34, as illustrated in FIG. 2, may comprise one half of an IC device N74S113 which constitutes a dual JK flip-flop chip, wherein the output from the inverter 32 is coupled to the J input of the device 34. The output of the inverter 30 is applied also as an input to a one-shot multivibrator 36 which may constitute for example an IC device 9601. The period of the one-shot may be controlled, for example, by an external variable resistance circuit 38 connected thereto. The output of the one-shot is applied through an inverter 40 to the K input of the JK flip-flop 34, while the clock input CK to the JK flip-flop is also supplied through an $\overline{\text{AND}}$ circuit 42 and an inverter 44 from the output of the one-shot 36 and from the inverter 30.

In the operation of the circuitry thus far described, the chrominance portion of the NTSC signal from the keying camera, produced by the backdrop color, is converted into a square wave by the signal shaping circuit and is provided as one input to the $\overline{\text{AND}}$ circuit 28, along with a square wave shaped signal from the reference signal generator 22. As shown in FIG. 2a, an output from the $\overline{\text{AND}}$ circuit 28 results whenever there is coincidence between the reference and chrominance signals. The one-shot circuit 36, in effect, then times the duration of coincidence to determine whether it is in excess of a predetermined minimum. That is, the coincidence signal from the $\overline{\text{AND}}$ circuit 28, when passed through the first inverter 30, is applied to the one-shot 36 to initiate its timed "on" period. Also, the output from the inverter circuit 30, is applied through the inverter circuit 32 to the J input of the clocked flip-flop 34, while the output of the one-shot is applied to the K input to the clocked flip-flop. The period of the one-shot 36 is set to correspond to a predetermined minimum desired coincidence period, so that when the phase of the chrominance signal is sufficiently close to the phase of the reference signal, the coincidence period will exceed the period of the one-shot, but when the coincidence time is less than the period of the one-shot the J input to the flip-flop will disappear before the termination of the K input thereto. The set up time for the JK flip-flop designated above is 3 ns and when the clocking signal terminates to end the enabling period of operation of the JK flip-flop 34, the output thereof will be controlled to indicate which of the inputs, J or K, terminated first. Also, as is apparent in FIG. 2 of the drawings, the termination of the J or K input is the function which terminates the clocking pulse since the clocking signal output from the $\overline{\text{AND}}$ circuit 42 and the inverter circuit 44 is controlled by the outputs from the $\overline{\text{AND}}$ circuit 28 and one-shot 36. In operation, during the pickup of background signals by the keying camera, the output from the $\overline{\text{AND}}$ circuit 28 will always have a duration exceeding that of the one-shot so that the output from the action or scene camera will be coupled to the transmitter in response to the output from the JK flip-flop which controls the switch 16. Similarly, when the duration of the one-shot 36 is sensed as exceeding the duration of the coincidence signal from the $\overline{\text{AND}}$ circuit 28, the output from the JK flip-flop will cause the transmission of the signal from the keying camera.

It may be desirable to include a third quantity in a composite signal wherein for example an announcer appears in an action scene together with an identifying legend defining the location of the action scene. Furthermore, it may be necessary that the background for the legend have an absence of color whereby the chrominance signal from the keying camera will go to zero when the sweep passes that colorless background. From the above description of the invention it is seen that the absence of a chrominance signal at the input to the amplifier and pulse shaper 24 will preclude any output from the $\overline{\text{AND}}$ circuit 28, so that the JK flip-flop will remain in its previously set state and will not change even though the sweep of the camera passes out of the desired blue area. To render the circuit functional even under the conditions of a colorless portion of the backdrop, there is provided a dual monostable multivibrator 46 illustrated in FIG. 2. The dual multivibrator device may comprise an IC N74123 chip, wherein the chrominance signal from the pulse shaper circuit 24a is applied as an input to each section, and wherein the output is used as a pre-set input to the second half 48 of the JK flip-flop 34. In the operation of this device, the output from the chrominance pulse shaper circuit 24a triggers one stage 46a of the monostable multivibrator, wherein that stage has a period in excess of one cycle of the chrominance signal. Accordingly, the output of that stage of the dual monostable multivibrator remains "on" continuously whenever a color signal is sensed by the keying camera. But, when a color signal is not sensed by the keying camera during its sweep for more than the period required for a complete cycle of the chrominance signal, then the output of the first stage 46a is switched to its "off" condition, and since the output of that first stage is applied through a NAND circuit 50 and an invertor 52 to the pre-set input of the second JK flip-flop 48, that flip-flop is disabled so that the switching circuit 16 couples the keying camera output to the transmitter. The JK flip-flop 48, as will be understood from the schematic of FIG. 2, provides a one cycle delaying function necessitated by the delayed sensing of cessation of the chrominance signal.

When the sweep of the keying camera passes from the gray background to the blue backdrop, the chrominance signal again triggers the first stage 46a of the one-shot which applies its "on" output to the NAND circuit 50. However, to maintain proper synchronization it is necessary to again delay the output of the JK flip-flops one cycle, and for this purpose the second half 46b of the one-shot chip has a period slightly less than one complete cycle of the chrominance signal, and has its $\overline{\text{Q}}$ output connected to the NAND circuit 50 so that output does not reach an "on" condition until just prior to the completion of one cycle of the chrominance signal. But when both inputs to the NAND circuit 50 are in their "on" condition, the pre-set input to the second JK flip-flop 48 again enables that circuit. The second one-shot circuit 46b has its $\overline{\text{Q}}$ output maintained in its "on" condition by means of a feed back loop from the output of the NAND circuit to the input to the circuit 46b as illustrated in the drawing.

Figure 3:
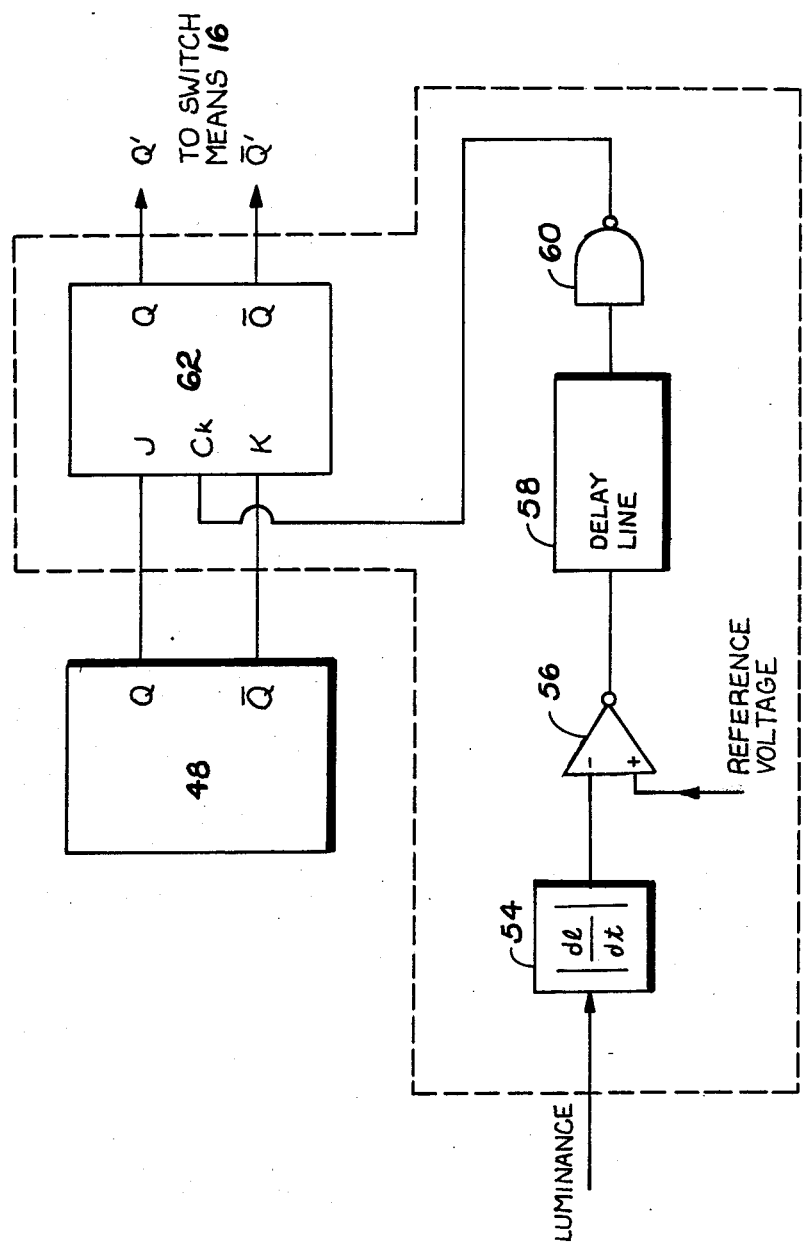
FIG. 3 is a diagram illustrating a circuit for preventing objectionable fringing effects which may otherwise occur in a composite T.V. picture.

In the operation of the invention thus far described, it will be understood that the interface between the backdrop and the keying object may produce a stair-step or fringing effect. This phenomenon, sometimes referred to as "crawling" is caused when the interface between the backdrop and the object shifts from one frame to the next along a single scan line. To compensate for objectionable fringing displays, a circuit is provided, as depicted in FIG. 3, wherein the luminance signal which may be isolated by the filter 20 is applied to a differentiating circuit 54 for providing an output signal in response to sharp changes in the luminance signal. The output of the differentiator circuit 54 is applied to a comparator 56 for providing an output whenever the differentiated signal exceeds a predetermined reference level. The output of the comparator 56 is then applied through a delay line 58 and an inverter 60 to the clocking input of a third JK flip-flop 62, wherein the output of the second JK flip-flop 48 provides the inputs to the third circuit 62 and wherein the output of the third circuit 62 may comprise the last stage of the digital phase comparator for controlling the switch 16.

Figure 4:
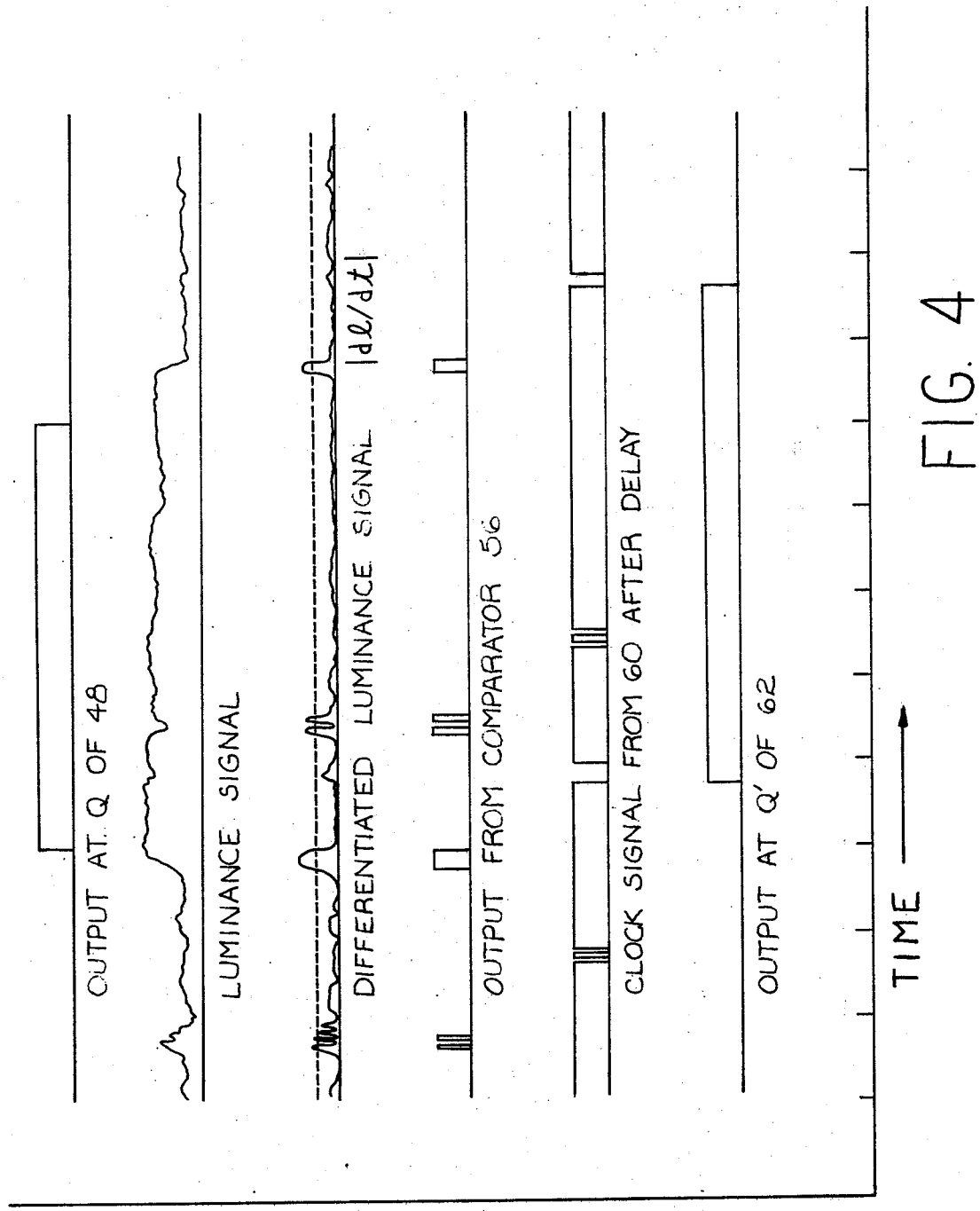
FIG. 4 is a timing diagram depicting the relative operating times of the circuit elements shown in FIG. 3.

In the operation of the circuit shown in FIG. 3, for preventing objectionable fringing, the effects of the digital timing are overcome by using the differentiated pulse resulting from a large variation in the luminance signal, wherein that large variation corresponds to an "edge" in the chrominance signal. Accordingly, as depicted in the timing diagram shown in FIG. 4, the switch 16 will be controlled to cause the display of the keying camera output at the same time during corresponding scans in successive frames since the differentiated luminance signal, corresponding to the raw output, is utilized as the switching control signal, and since that differentiated signal is delayed for a time sufficient to insure the presence of an output from the second JK flip-flop.

High speed devices are believed to be preferable for use as all of the independent $\overline{\text{AND}}$ and inverter circuits which are illustrated in the drawings and used in conjunction with the integrated circuit devices discussed herein. For example, in a preferred embodiment, the $\overline{\text{AND}}$ gates may constitute portions of N74S00 IC devices, while the inverters may constitute N74S04 IC devices.

It is to be understood that the foregoing detailed description of circuitry disclosed herein is directed toward a preferred embodiment of Applicant's invention, but that such invention is not limited to the specifically disclosed circuitry, and that the invention encompasses modifications which fall within the terms of the claims set forth herein.

We claim:

1. A chroma-keying circuit for generating a switching control signal for use in alternately selecting the outputs of two color TV cameras, wherein a color change detected by one of the cameras determines the switching time, said circuit comprising:

circuit means for isolating a chrominance signal produced by one of the cameras;

means for providing a reference signal output having a frequency which is the same as that of the chrominance signal, wherein said reference signal is in phase with a predetermined color phase of said chrominance signal;

phase coincidence detecting means having first and second inputs coupled to receive respectively said chrominance signal and said reference signal and for providing an output when said first and second inputs are received coincident;

pulse generating means having an input coupled to the output of said phase coincidence detecting means and having an output for providing a signal of predetermined duration; and timing circuit means having inputs coupled respectively to said coincidence detecting means and said pulse generating means for providing a switching control signal when the duration of said pulse generator means output exceeds that of said coincidence detecting means.

2. A chroma-key circuit for generating a switching control signal as set forth in claim 1 further comprising means for detecting a lapse of chrominance signals produced by said one camera, and means coupled to said lapse detecting means for disabling the output of said timing circuit means when a lapse of said chrominance signals is detected.

3. A chroma-key circuit for generating a switching control signal as set forth in claim 1 further comprising a circuit for preventing fringing effects produced as a result of variances in said switching control signals and comprising circuit means for isolating a luminance signal produced by said one camera, means for differentiating a luminance signal, means for delaying the differentiated luminance signal and means for controlling said timing circuit means to be triggered to produce said switching control signal in response to said delayed differentiated luminance signal.

4. A chroma-key circuit for generating a switching control signal as set forth in claim 1, further comprising pulse shaping means coupled between said chrominance signal isolating means and said reference signal output means for modifying said chrominance signal and said reference signal to form respective square waves.

5. A chroma-key circuit for generating a switching control signal as set forth in claim 4, wherein said pulse generating means comprises a one-shot circuit having its input coupled to the output of said phase coincidence detecting means, and having an output coupled to said timing circuit means.

6. A chroma-key circuit for generating a switching control signal as set forth in claim 5, wherein said timing circuit means comprises a flip-flop circuit having first and second inputs coupled respectively to said phase coincidence detecting means output and said pulse generating means output, and having a clock input coupled to both said phase coincidence detecting means output and pulse generating means output.

* * * * *